(12) United States Patent
Murata et al.

(10) Patent No.: US 6,983,964 B2
(45) Date of Patent: Jan. 10, 2006

(54) VEHICLE BUMPER STRUCTURE

(75) Inventors: Seishiro Murata, Saitama (JP); Satoru Shioya, Tochigi-ken (JP); Masayuki Fukuda, Kanuma (JP)

(73) Assignee: JSP Corporation (JP)

( * ) Notice: Subject to any disclaimer, the term of this patent is extended or adjusted under 35 U.S.C. 154(b) by 0 days.

(21) Appl. No.: 10/787,140

(22) Filed: Feb. 27, 2004

(65) Prior Publication Data

US 2004/0174024 A1 Sep. 9, 2004

(30) Foreign Application Priority Data

Mar. 4, 2003 (JP) .......................................... 2003-057707
Apr. 24, 2003 (JP) .......................................... 2003-120578

(51) Int. Cl.
*B60R 19/22* (2006.01)

(52) U.S. Cl. ....................................... 293/109; 296/121
(58) Field of Classification Search ................. 293/107, 293/109, 120–122, 142
See application file for complete search history.

(56) References Cited

U.S. PATENT DOCUMENTS

| 4,348,042 A | * | 9/1982 | Scrivo .......................... 293/120 |
| 4,504,534 A | | 3/1985 | Adachi et al. .................. 428/71 |
| 4,626,555 A | | 12/1986 | Endo et al. ..................... 521/59 |
| 4,756,948 A | | 7/1988 | Kuramochi et al. .......... 428/167 |
| RE32,780 E | | 11/1988 | Yoshimura et al. ....... 428/304.4 |
| 5,139,297 A | | 8/1992 | Carpenter et al. ........... 293/132 |
| 5,290,078 A | * | 3/1994 | Bayer et al. .................. 293/120 |
| 5,340,841 A | | 8/1994 | Tokoro et al. ................. 521/60 |
| 5,747,549 A | | 5/1998 | Tsurugai et al. .............. 521/60 |
| 6,034,144 A | | 3/2000 | Shioya et al. .................. 521/60 |
| 6,213,540 B1 | * | 4/2001 | Tusim et al. ............ 296/187.02 |
| 6,308,999 B1 | * | 10/2001 | Tan et al. ..................... 293/109 |
| 6,354,641 B1 | * | 3/2002 | Schroeder et al. ........... 293/155 |
| 6,451,419 B1 | | 9/2002 | Tsurugai et al. ......... 428/304.4 |
| 6,637,788 B1 | * | 10/2003 | Zollner et al. ............... 293/107 |
| 6,648,383 B2 | * | 11/2003 | Vismara et al. .............. 293/120 |
| 6,832,795 B2 | * | 12/2004 | Bastien et al. ............... 293/120 |
| 2003/0034580 A1 | | 2/2003 | Sasaki et al. .................. 264/51 |
| 2003/0141728 A1 | | 7/2003 | Arvelo et al. ................ 293/133 |

FOREIGN PATENT DOCUMENTS

| CA | 2421888 | 3/2003 |
| DE | 199 11 595 | 9/2000 |
| EP | 1046546 | 4/1999 |
| FR | 2 805 789 | 9/2001 |
| JP | 10-081182 | 3/1998 |
| JP | H11-208389 | 3/1998 |
| JP | 11-208389 | 3/1999 |
| WO | 00/64707 | 11/2000 |
| WO | 02/24487 | 3/2002 |
| WO | 03/037971 | 5/2003 |
| WO | 03/078127 | 9/2003 |

* cited by examiner

*Primary Examiner*—Dennis H. Pedder
(74) *Attorney, Agent, or Firm*—Lorusso & Loud

(57) ABSTRACT

A bumper for attachment to the front of a vehicle, includes an elongated bumper beam having a front face provided with at least one rearwardly depressed portion extending lengthwise of the bumper beam, a compressable energy absorbing foam material extending lengthwise of the bumper beam, and a bumper fascia covering the foam material. The foam material has a first portion received in the depressed portion and a second portion protruding forwardly from the front face of the bumper beam such that the second portion is compressed into the depressed portion upon receipt of a collision impact.

14 Claims, 14 Drawing Sheets

PRIOR ART

VEHICLE BUMPER STRUCTURE

CROSS-REFERENCE TO RELATED APPLICATION

This application claims, under 35 USC 119, priorities of Japanese Patent Applications No. 2003-057707, filed Mar. 4, 2003 and No. 2003-120578, filed Apr. 24, 2003, disclosures of which, inclusive of the specifications, claims and drawings, are hereby incorporated by reference herein.

BACKGROUND OF THE INVENTION

1. Field of the Invention

This invention relates to a bumper for attachment to a front of a vehicle such as an automobile.

2. Description of Prior Art

A front bumper of an automobile generally serves to prevent damage of the automobile body when the automobile is traveling at a speed of 10 km/hour or less and collides with an object such as another automobile or a wall.

Shown in FIG. 14 is one example of such a bumper structure which includes a tubular bumper beam 22, an energy absorbing foam material 23 overlying a front wall of the bumper beam 22, and a bumper fascia 21 overlying the foam material 23. The foam material 23 is designed to absorb collision energy and to restore to its original shape even when subjected to repeated collision impacts. Therefore, the maximum strain of the foam material is designed such that the foam material can maintain its restoration force even when subjected to a large collision impact. To this end, the foam material 23 is required to have a large thickness in the front to rear direction and a relatively high hardness.

However, pedestrians are likely to be seriously injured if struck by an automobile having such a bumper. Recently, there is an increasing demand for a vehicle bumper structure which can protect a pedestrian when struck by an automobile. Thus, the energy absorbing foam material is required to be made of a relatively soft material having a low compression modulus, so that the leg impact can be reduced and serious knee injury can be avoided.

However, since the modem cars are designed to maximize energy efficiency, to increase interior (occupant) space and to provide good appearance, the bumper is required to be compact and light in weight.

At present, no bumper structures on the market can satisfy simultaneously the requirements of (1) prevention of damage to the vehicle, (2) protection of pedestrians and (3) a compact and light weight structure.

To meet with the above requirements (1) and (2), the thought might occur to use a two-layer structure in which a relatively soft foam material for protecting pedestrians is provided in front of a relatively hard foam material for preventing vehicle damage. In this case, however, the requirement (3) cannot be met. When the dimension of the soft foam material in the front-to-rear direction is reduced, collision with a pedestrian causes "bottoming out" of the foam material and generates a large load to cause injury to the pedestrian. Moreover, with the above two-layer structure, it is difficult to maintain the performance of the soft foam material, because collision of the vehicle against a wall or another vehicle will subject the soft foam material to a strain which is beyond the maximum strain thereof so that the soft foam material cannot restore to its original shape. Therefore, when the bumper undergoes a high impact collision, it is necessary to replace the soft foam.

JP-A-H11-208389 discloses a bumper for an automobile which includes a collision energy absorber disposed between a front part of a bumper beam and a bumper fascia. The energy absorber has a lower layer and an upper layer provided on the lower layer and composed of a row of a number of spaced apart blocks arranged with suitable spacing across the width of the vehicle. JP-A-H11-208389 describes that in case of collision with a leg of a pedestrian, the leg is advanced into the space between two adjacent blocks by deflection deformation thereof in the direction of the car width so that reaction force is suppressed and the collision energy is absorbed by only the lower layer. In the case of collision with a wall or another automobile, both the upper and lower layers are compression deformed in the front to rear direction. In practice, however, it is difficult with the above bumper structure to satisfy the above requirements (1), (2) and (3) at the same time. More specifically, (a) a pedestrian's leg is not always received in the space between two adjacent blocks, (b) therefore, the blocks must be thin and/or soft in order to be deformed laterally and to properly receive a pedestrian3 s leg therebetween, (c) the upper layer is apt to be broken, and (d) the dimension of the energy absorber in the front-to-rear direction must be increased to prevent damage to the vehicle so that a compact structure cannot be attained.

SUMMARY OF THE INVENTION

It is an object of the present invention to provide a bumper which can solve the above problems of the conventional bumpers.

It is another object of the present invention to provide a compact, light weight bumper which uses an energy absorbing foam material, which can protect pedestrians, particularly pedestrians' legs, and which can effectively prevent vehicle damage upon collision.

It is a further object of the present invention to provide a bumper of the above-mentioned type, in which the foam material can withstand one or more collisions with a wall or another vehicle.

In accordance with the present invention, there is provided a bumper for attachment to the front of a vehicle, comprising an elongated bumper beam having a front face provided with at least one rearwardly depressed portion extending lengthwise of said bumper beam, a compressable energy absorbing foam material extending lengthwise of said bumper beam, and a bumper fascia covering said foam material, said foam material having a first portion received in said depressed portion and a second portion protruding forwardly from said front face of said bumper beam such that said second portion is compressed into said depressed portion upon receipt of a collision impact.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

The bumper of the present invention is configured to be attached to the front of a vehicle such as an automobile for reducing impact on a pedestrian's leg upon collision, while preventing vehicle damage by collision with walls, etc.

Figure 1:
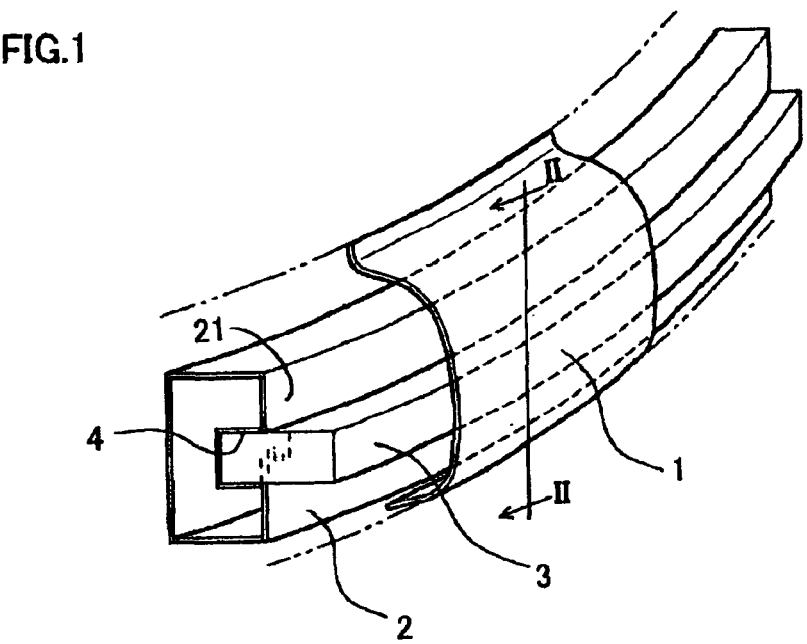
FIG. 1 is a perspective view schematically illustrating a bumper according to the present invention.
Figure 2:
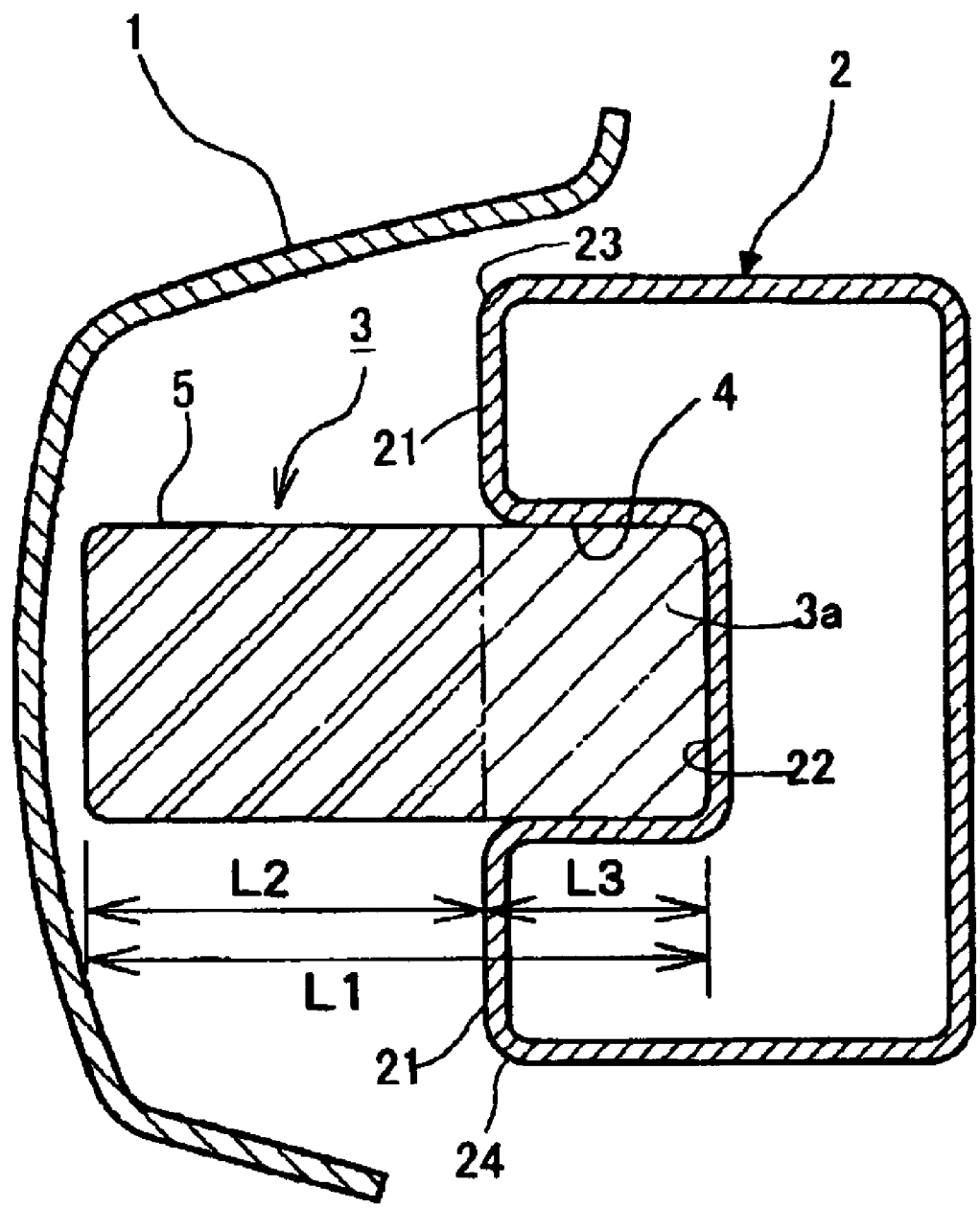
FIG. 2 is a cross-sectional view taken on the line II—II in FIG. 1.

One preferred embodiment of the bumper structure according to the present invention is illustrated in FIGS. 1 and 2, in which the reference numeral 2 designates an elongated bumper beam. The beam 2, when mounted on the front of a vehicle, extends laterally, namely in the direction normal to the front-to-rear direction (running direction) of the vehicle. The bumper structure is generally curved from side-to-side of the vehicle and the bumper beam 2 is also curved. However, such a curved structure is not essential and other configurations can be used for the purpose of the present invention.

The bumper beam 2 is illustrated as a tubular beam. However, it should be understood that a wide variety of shapes, configurations, materials and processes for the manufacture of the bumper beam 2 are contemplated by the present invention. For example, the beam 2 may be a solid body rather than a hollow body. The cross-section of the hollow beam may be any desired shape, for example, square, rectangular parallelopiped or C-shaped. Any conventionally known bumper beam such as disclosed in Japanese Kokai Publication Nos. JP-A-H11-78730 and JP- A-2001-322517 may be suitably used for the purpose of the present invention, as long as it can absorb the collision energy through the strain of the hereinafter described energy absorbing foam material and can withstand collision energy to prevent vehicle damage. Any conventionally used material such as a metal, a plastic or synthetic wood may be used to construct the bumper beam 2.

The bumper beam 2 has a front face 21 provided with at least one rearwardly depressed portion 22 (longitudinal channel) extending lengthwise of the bumper beam 2. In the embodiment shown in FIGS. 1 and 2, only one depressed portion 22 is provided at an intermediate position between upper edge 23 and lower edge 24 of the front face 21 to form a U-shaped recess 4.

Designated as 1 is a bumper fascia constituting a front surface of the bumper structure. A compressable energy absorbing foam material 3 is disposed between the fascia 1 and the beam 2. The foam material 3 extends lengthwise of the bumper beam 2 and has a first portion 3a received in the depression 22 and a second portion 5 protruding forwardly from the front face 21 of the bumper beam 2.

In the bumper structure constructed as described above, the second portion 5 of the foamed material 3 is compressed in the U-shaped recess 4 by impact upon collision. Thus, the bumper structure of the present invention has a relatively small dimension in the front-to-rear direction, even when the foam material 3 has a relatively long front-to-rear dimension sufficient to protect a pedestrian's legs upon impact. Therefore, the bumper structure can contribute to reduction of size and weight of the vehicle and yet can avoid serious knee injury. Further, vehicle damage can be effectively prevented without adversely affecting freedom of vehicle design.

As the compressable energy absorbing foam material 3, any synthetic resin foam having a suitable cushioning property may be used. The foam material preferably has a compression permanent set (according to JIS K6767-1976) of 20% or less, more preferably 18% or less, still more preferably 15% or less, most preferably at least 10% or less. For reasons of excellent elasticity and suitable rigidity, a polyolefin-based resin foam is preferably used as the synthetic resin foam. Examples of the polyolefin-based resin include polyethylene-based resins such as linear low density polyethylenes, crosslinked low density polyethylenes and ethylene-styrene copolymers, and polypropylene-based resins such as propylene homopolymers, copolymers of propylene and other olefins and copolymers of propylene and styrene. Polypropylene-based resin foams are particularly preferred for reasons of excellent rigidity, heat resistance and chemical resistance. The foam material 3 may be suitably obtained by molding expanded resin beads in a mold. Expanded non-crosslinked polypropylene-based resin beads, whose surfaces have been modified with an organic peroxide by the method disclosed in Japanese Kokai Publication No. JP-A-2000-167460, are useful for obtaining a suitable foam material 3. If desired, the foam material 3 may be used in combination with any other suitable auxiliary cushioning material such as a rubber or a spring. Such an auxiliary cushioning material may be embedded in the foam material 3.

Although not shown in the drawings, the bumper beam 2 may be provided with two or more vertically spaced apart U-shaped recesses 4, if desired. In this case, the foam material 3 may be disposed in at least one of the U-shaped recesses 4 with a portion (second portion 5) thereof forwardly protruding from the front face 21 of the beam 2. Of course, the foam material 3 may be provided in each of the U-shaped recesses 4. In embodiments with two or more U-shaped recesses 4, the dimensions and configurations thereof may be the same or different. Similarly, when two or more foam materials 3 are used, the dimensions and configurations thereof may be the same or different.

Figure 5A:
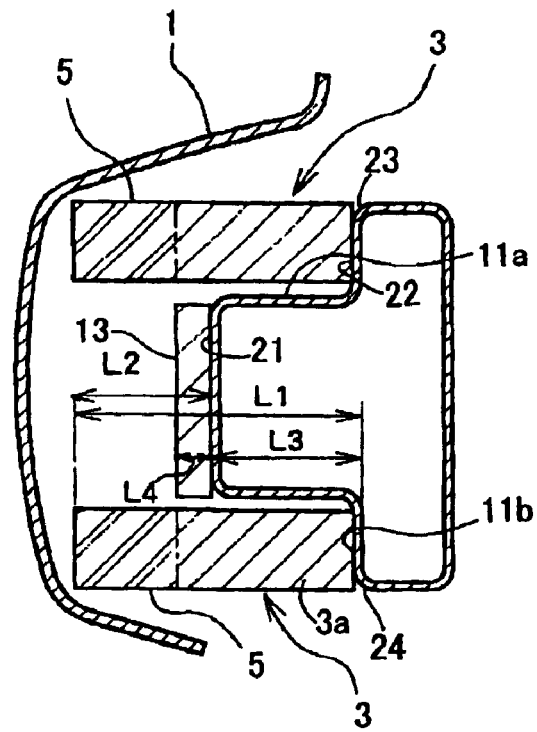
FIGS. 5(a) through 5(d) are sectional views similar to FIG. 2, showing various further embodiments according to the present invention.
Figure 5B:
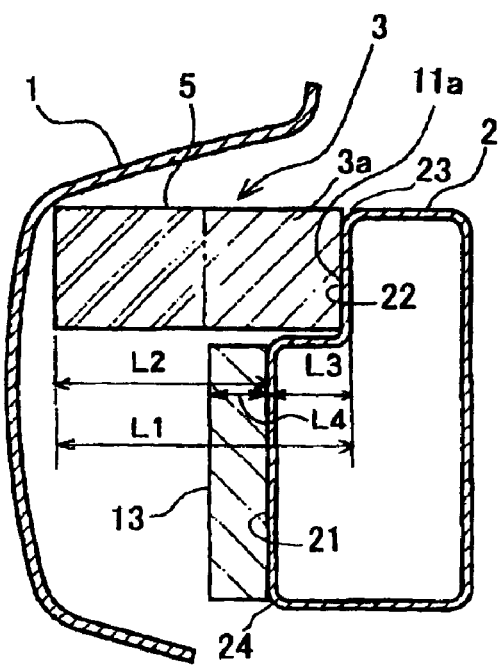

In the embodiment shown in FIGS. 1 and 2, the depressed portion 22 is formed between the upper and lower edges 23 and 24 of the front face 21. Alternatively, the depressed portion 22 may be formed extending from at least one of the upper and lower edges 23 and 24 of the front face 21, as shown in FIGS. 5(a) and 5(b), to form upper stepped portion 11a and/or lower stepped portion 11b in the front face 21. Similar to the embodiment shown in FIGS. 1 and 2, in the embodiments of FIGS. 5(a) and 5(b) a foam material 3 extends lengthwise of the bumper beam 2 and has a first portion 3a received in the stepped portion 11a (in the case of FIG. 5(b)) or in each of the stepped portions 11a and 11b (in the case of FIG. 5(a)) and a second portion 5 protruding forwardly from the front face 21 of the bumper beam 2. When two stepped portions 11a and 11b are provided, the dimensions and configurations of thereof may be the same or different.

The front face 21 of the bumper beam 2 may be provided with one or more stepped portions 11a and/or 11b. In this case, the foam material 3 may be disposed in at least one of the stepped portions 11a and 11b with a portion (second portion 5) thereof protruding forwardly from the front face 21 of the beam 2. When two or more foam materials 3 are used, the dimensions and configurations thereof may be the same or different.

In the bumper structure constructed as described above, the second portion 5 of the foamed material 3 is compressed into the U-shaped recess 4 or into the stepped portion or portions 11a and/or 11b upon receipt of a collision impact. Thus, the bumper structure of the present invention has a relatively small dimension in the front-to-rear direction, even when the foam material 3 has a relatively long front-to-rear dimension sufficient to protect pedestrian's legs upon impact. In other words, it is easy to design the bumper structure according to the present invention such that the compression load generated therein by collision at a given level impact energy is below the desired upper limit load and yet the weight and size thereof are small. The term "desired upper limit load" as used herein is intended to refer to a compression load below which a pedestrian's leg would not be seriously injured by the collision at no more than the given impact energy.

Of course, the rearwardly depressed portion 22 must be able to withstand the energy exerted by the compression of the foam material 3 caused by a collision.

Figure 3:
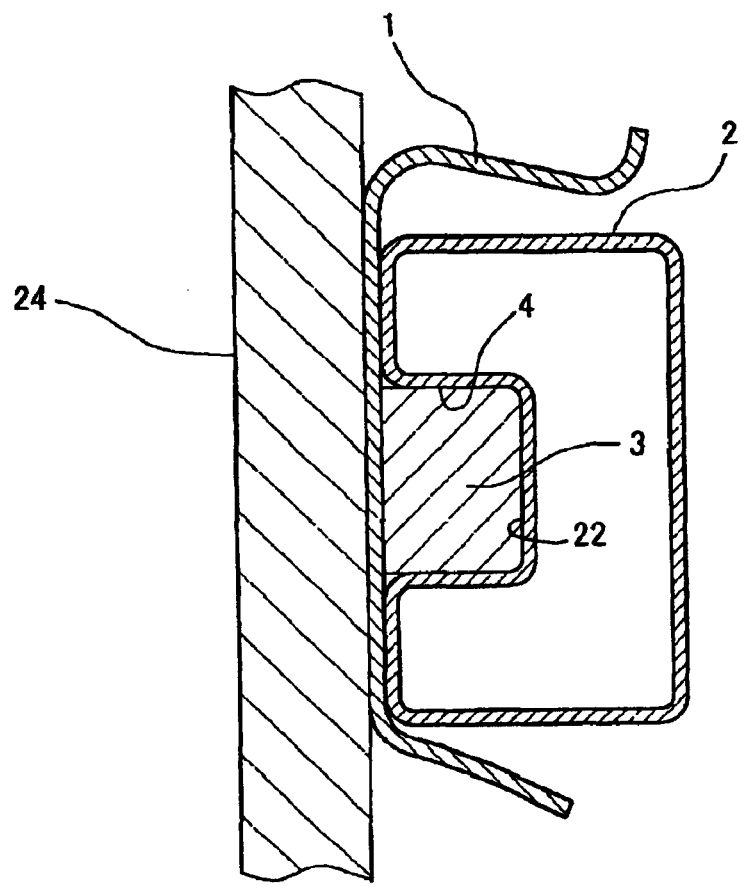
FIG. 3 is a sectional view similar to FIG. 2, showing the state in which the bumper of FIG. 2 has collided with a wall.

Further, the bumper structure of the present invention can prevent vehicle damage upon collision with a wall or another vehicle. FIG. 3 schematically depicts a state in which the bumper structure of FIG. 2 has collided with a wall 24. The second portion 5 of the foam material 3 (FIG. 2) has been fully compressed into the U-shaped recess 4. In this manner, the collision energy is absorbed by the beam 2 to protect the vehicle. In this case, since the foam material 3 has a sufficient length and does not bottom out, the bumper structure does not loose its function to prevent pedestrians from being seriously injured. Namely, since there is no bottoming out, the foam material 3 can recover its original shape without a substantial loss of its energy absorbing function. Thus, the bumper structure of the present invention can simultaneously attain the effects of (1) prevention of damage to the vehicle, (2) protection of pedestrians and (3) provision of a compact and light weight structure. Moreover, the foam material 3 is prevented from being further compressed beyond the state as shown in FIG. 3 and, therefore, can restore to its original state and can be reused for protecting pedestrians, when separated from the impacted object. Namely, even after the bumper has undergone repeated collisions, the foam material 3 can serve to protect pedestrians.

It is, therefore, preferred that the bumper structure have a design which prevents the foam material 3 from bottoming-out. For example, since the compression load of a foam material made from a molding of foamed polypropylene beads abruptly increases when the strain exceeds about 60 to 70%, the bottoming-out of the foam material may be prevented when about at least 30 to 40% of the total dimension (L1) (total width) of the foam material 3 is received in the rearwardly depressed portion 22.

In FIG. 1 and FIGS. 5(a) and 5(b), the foam material 3 is illustrated as a rectangular parallelopiped body. However, it should be understood that a wide variety of shapes and configurations of the foam material 3 are contemplated by the present invention. For example, the front end of the foam material 3 can be rounded to conform to the inside wall of the bumper fascia 1. One or more weight reducing portions such as recesses, holes or grooves may be formed in any desired surface (such as front surface and upper or lower surfaces) of the material 3 or inside thereof. Further, the foam material 3 need not be closely fitted in the U-shaped recess 4 or stepped portion 11a or 11b, although, from the standpoint of design efficiency, the foam material 3 is suitably closely fitted thereinto.

The rigidity and the dimensions of the foam material 3 are suitably determined so that (a) the bumper structure can protect a pedestrian struck by the vehicle without seriously injuring the pedestrian's leg and (b) the foam material 3 can restore to its original shape even after the vehicle collides with another vehicle or a wall. The rigidity of the foam material 3 depends upon the apparent density and the kind of resin. The vertical dimension of the foam material 3 is generally not greater than the vertical dimension of the depressed portion 22 and the lateral length of the foam material 3 is generally not greater than the lateral length of the fascia 1.

As used herein, the term "vertical length" of the foam material 3 and the depressed portion 22 is intended to refer to the length of the vertical dimension of the bumper, i.e., in the dimension of the height of the vehicle. The term "lateral length" of the foam material 3 and the fascia 1 relates to the length of the lateral dimension, i.e., side-to-side of the vehicle to which the bumper structure has been mounted. Similarly, the term "front-to-rear length" of the foam material 3 is the length of its dimension in the front-to-rear direction (running direction) of the vehicle to which the bumper structure has been mounted.

The vertical length of the depressed portion 22 of the beam 2 (when the beam 2 has two or more depressed portions 22, a total length of the vertical lengths of the depressed portions 22) is generally 30 to 80%, preferably 40 to 70%, of the vertical dimension of the beam 2.

There is a demand for a bumper core which can absorb energy of collision between a pedestrian and an automobile traveling at a relatively high speed of, for example, 40 km/hour, so that serious knee injury can be avoided. In this respect, the design of the foam material 3 plays an important role, though the energy to be absorbed by the foam material 3 varies depending upon type of vehicle on which the bumper is mounted, since the collision energy is also absorbed by other parts of the bumper structure such as the fascia 1, beam 2 and a front skirt with which may strike the pedestrian's ankles. Generally, however, the bumper structure preferably has a design which prevents the foam material 3 from bottoming-out. Thus, in the case of a foam material made as a molding of foamed polypropylene beads, for example, wherein the compression load abruptly increases when the strain exceeds about 60 to 70%, the bottoming-out of the foam material may be prevented when about at least 30 to 40% of the total width (length L1) of the foam material 3 is received in the rearwardly depressed portion 22. In this case, the full width of the second portion 5 (protruding portion) (length L2) can be utilized for absorbing the collision energy without bottoming out thereof, namely, without generating a high load.

It is preferred that the bumper structure not only protect pedestrians but also permit the foam material 3 to be reusable even after repeated collisions with walls or other vehicles. This can be achieved by selecting a ratio L2/L1 so as to permit elastic recovery of the foam material 3 while selecting the length L2 of the second portion 5 of the foam material 3 such that the load generated therein by collision at a given impact force is below the desired upper limit load. To satisfactorily prevent bottoming-out, and to provide satisfactory protection of pedestrians and satisfactory reusability of the foam material 3, it is preferred that the ratio of the width L2 of the second portion 5 to the width L1 of the foam material 3 (L2/L1) be in the range of 0.4 to 0.9, more preferably 0.5 to 0.8, most preferably 0.5 to 0.7. Further, it is preferred that L1 be in the range of 40 to 150 mm, more preferably 50 to 130 mm, most preferably 60 to 120 mm. The foam material 3 is preferably mounted with its rear end abutting against the bottom of the depressed portion 22.

Figure 4A:
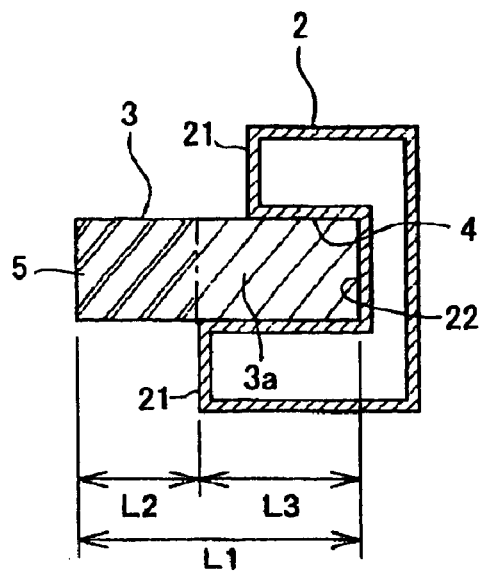
FIGS. 4(a) through 4(c) are sectional views similar to FIG. 2, showing further embodiments of a bumper according to the present invention.
Figure 4B:
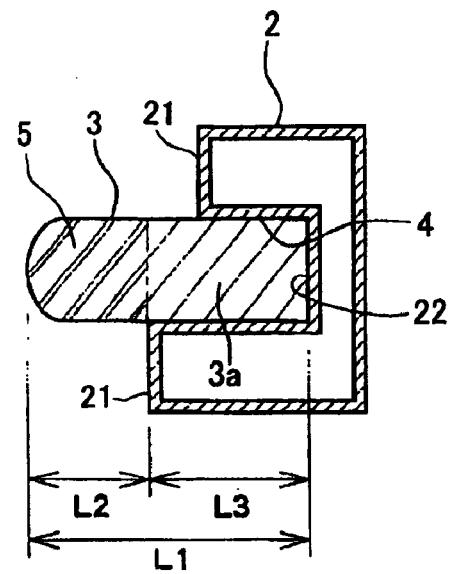
Figure 4C:
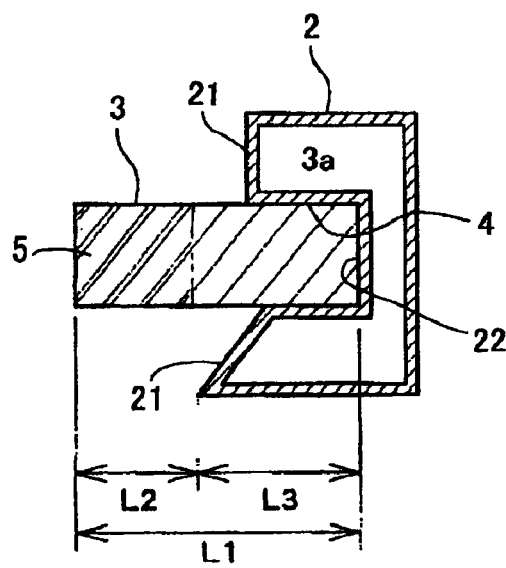

Various modifications may be made to the bumper beam 2 and foam material 3. Examples of some modifications are shown in FIGS. 4(a) to 4(c), in which the same reference numerals as those in FIGS. 1 and 2 designate similar components. In the embodiments shown in FIG. 4(a) to 4(c), upper and lower portions of the front face 21 of the beam 2 are not coplanar. In this case, the width L1 of the foam material 3 is the dimension from the foremost end to the rearmost end of the foam material 3 in the front- to-rear direction, and the width L2 of the protruding second portion 5 is the distance between the foremost portion of the front face 21 and the foremost end of the 5 foam material 3 (the width of the portion hatched with double lines in FIGS. 4(a) to 4(c)) in the front-to-rear direction. L3 represents the depth of the depressed portion 22 (recess 4 or stepped portion 11a or 11b) and is the distance between the bottommost portion of the depressed portion and the foremost portion of the front face 21 in the front-to-rear direction.

Figure 6:
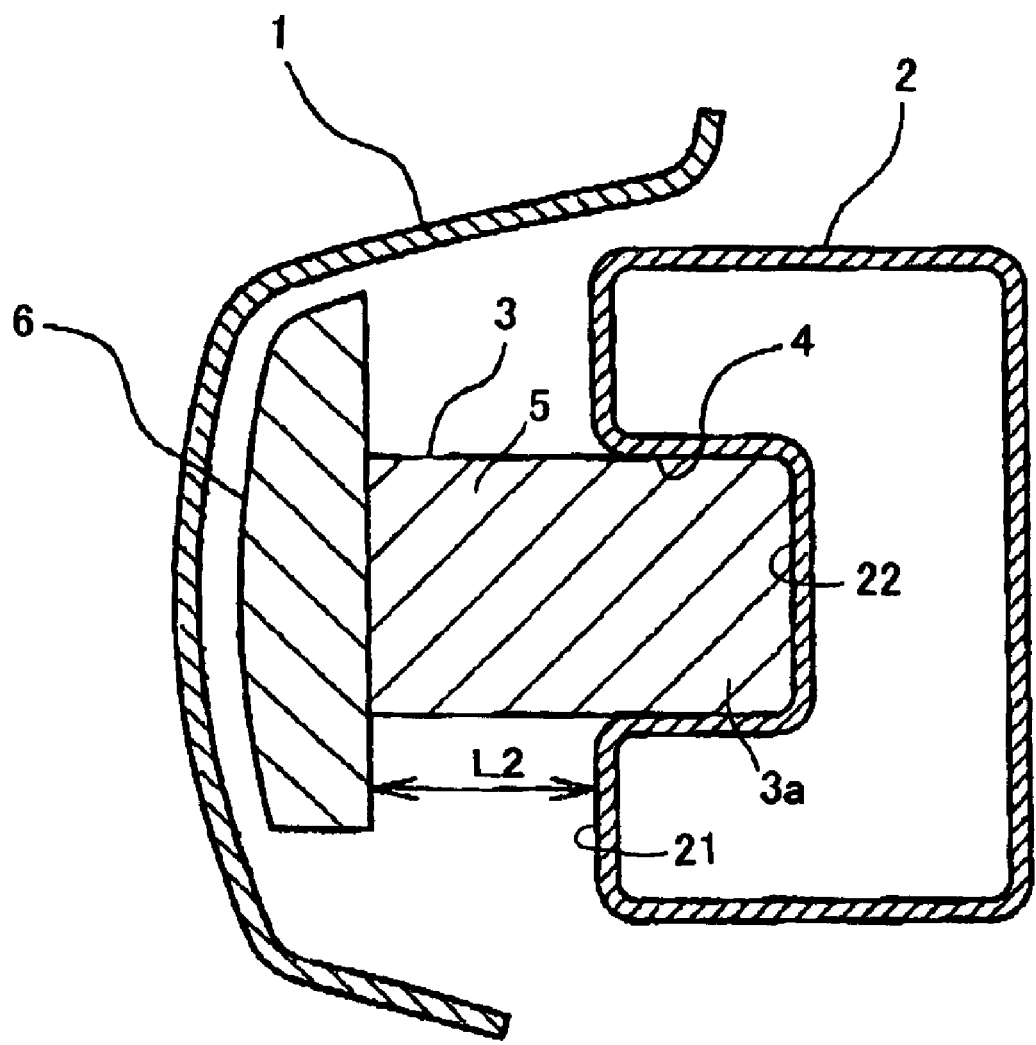
FIG. 6 is a sectional view similar to FIG. 2, showing a further embodiment of a bumper according to the present invention.
Figure 7:
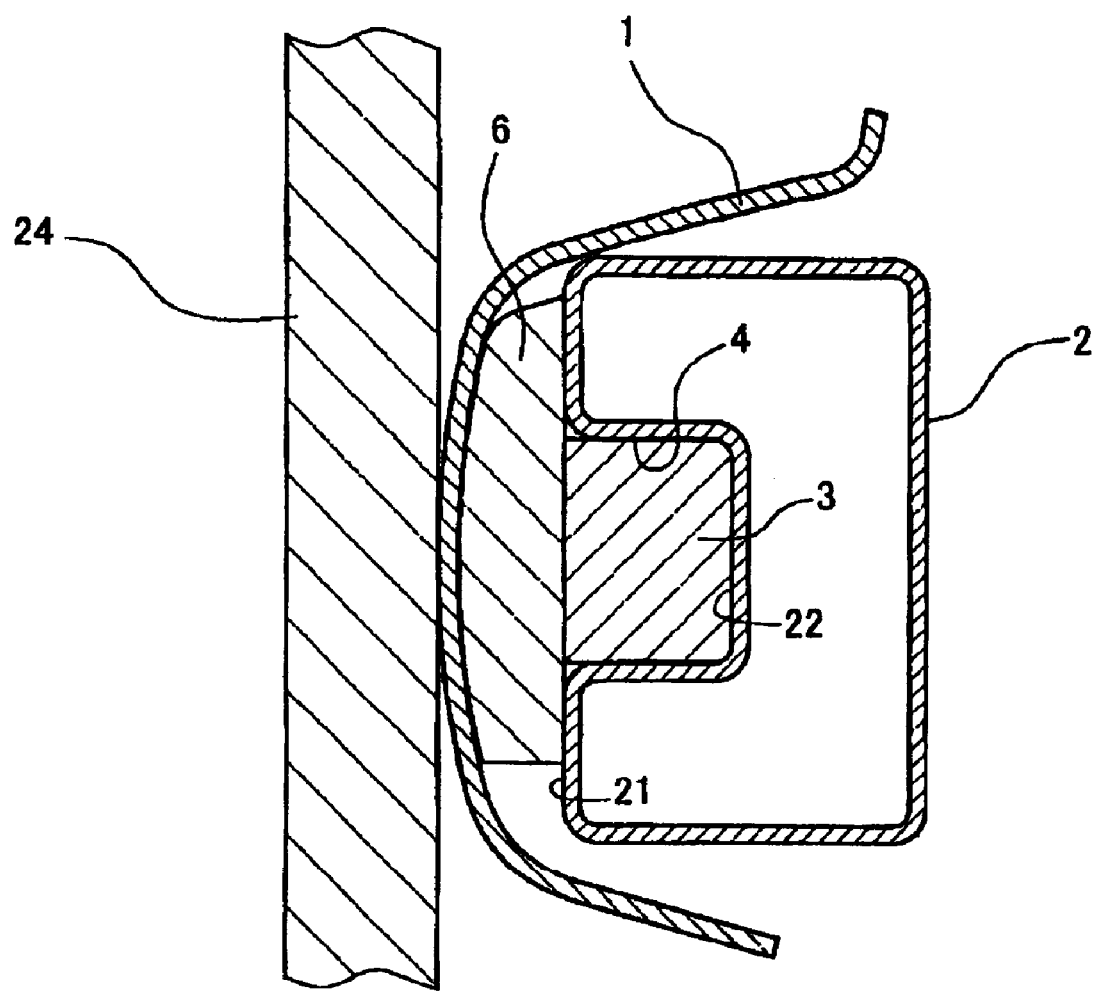
FIG. 7 is a sectional view showing the state in which the bumper of FIG. 6 has collided with a wall.

Another preferred embodiment of the present invention is illustrated in FIGS. 6 and 7, in which the same reference numerals as those in FIGS. 1 and 2 designate similar features. In this embodiment, an energy absorbing body 6 is provided at a front end of the second portion 5 of the foam material 3. The energy absorbing body 6 has a vertical length greater than the vertical length of the depressed portion 22 so that, as shown in FIG. 7, when the bumper collides with a wall 24 or another vehicle, the energy absorbing body 6 comes into contact with the front face 21 to absorb part of the collision energy. Therefore, it is possible to reduce the rigidity and other mechanical strengths of the bumper beam 2 and to reduce the weight of the bumper structure.

In the embodiment of FIGS. 6 and 7, it is preferred that the energy absorbing body 6 be brought into contact with the bumper beam 2 only after the foam material 3 has been fully compressed into U-shaped recess 4 and has assumed the position as shown in FIG. 7. When the energy absorbing body 6 is made of a material which is harder than the foam material 3 and when the energy absorbing body 6 has such a configuration or shape as to come into contact with the beam 2 before the foam material has been fully compressed into the recess 4, a compression load which is greater than the desired upper limit load may be generated in the energy absorbing body 6 so that a pedestrian will not be protected.

Figure 5C:
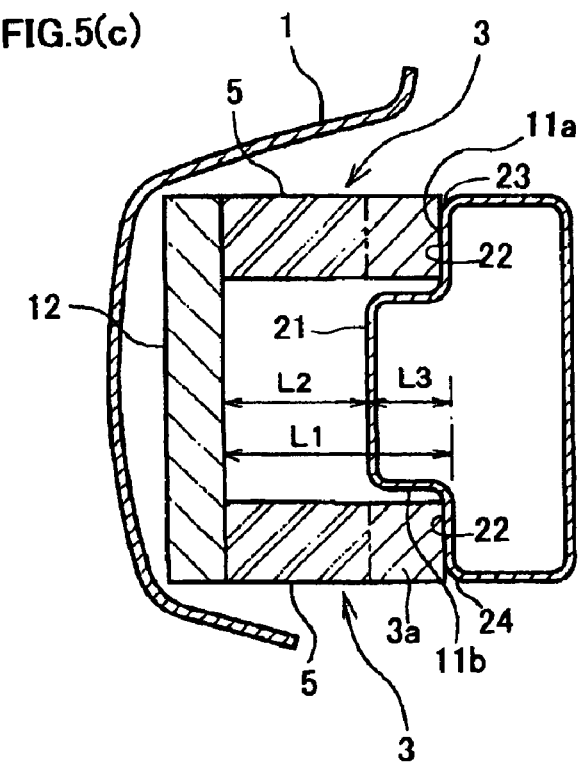
Figure 5D:
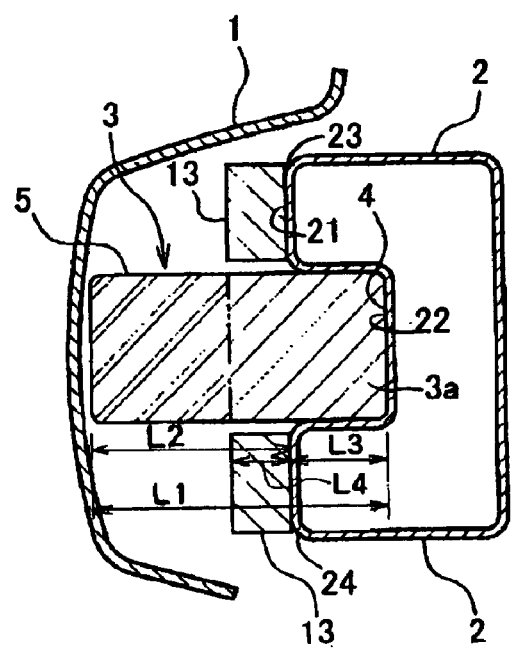

FIG. 5(c) depicts an embodiment in which the above-described energy absorbing body is applied to a bumper having a depressed portion 22 provided at each of upper and lower edges 23 and 24 of a front face 21 to form upper and lower stepped portions 11a and 11b. The energy absorbing body is designated as 12 and is an integrated body including upper and lower foam portions 3 respectively received and secured in the stepped portions 11a and 11b. The function and features of the energy absorbing 12 are the same as those of the energy absorbing body 6 of FIG. 6 and are not repeated here.

The energy absorbing body 6 or 12 may be made of any desired material such as, for example, a synthetic resin foam body, a non-foamed synthetic resin body, a metal honeycomb body or a rubber body. A synthetic resin foam body is preferably used since the energy absorbing characteristics thereof can be easily selected according to its apparent density and since the design thereof may be suitably determined to match the limited available space within the bumper structure. A resilient foam body similar to the foam material 3 is particularly suited for use as the energy absorbing body 6 or 12 for reasons of good shape recovery characteristics. Such a foam body may be suitably made from a foamed molding of expanded resin beads.

The energy absorbing body 6 or 12 is desirably integrated with the foam material 3 into a unitary structure in the interest of ease of assembly of the bumper structure. Integration may be by use of an adhesive, by fuse-bonding or by any suitable connecting means. Alternatively, the energy absorbing body 6 or 12, when made of a resin foam, may be molded together with the foam material 3 into a single foamed molding. As long as the energy absorbing body 6 or 12 is maintained in a fixed position inside the fascia 1, such an integrated structure is not essential.

The energy absorbing body 6 or 12 made of a resin foam preferably has a greater apparent density (preferably 0.64 to 0.225 g/cm$^3$) than that of the foam material 3. In this case, the collision energy which remains unabsorbed by the foam material 3 is absorbed by the energy absorbing body 6 or 12, so that the beam 2 receives a reduced force upon collision. However, the apparent density of the energy absorbing body 6 or 12 made of a resin foam may be in the range of 0.026 to 0.064 g/cm$^3$ when further protection of pedestrians is intended.

Figure 8:
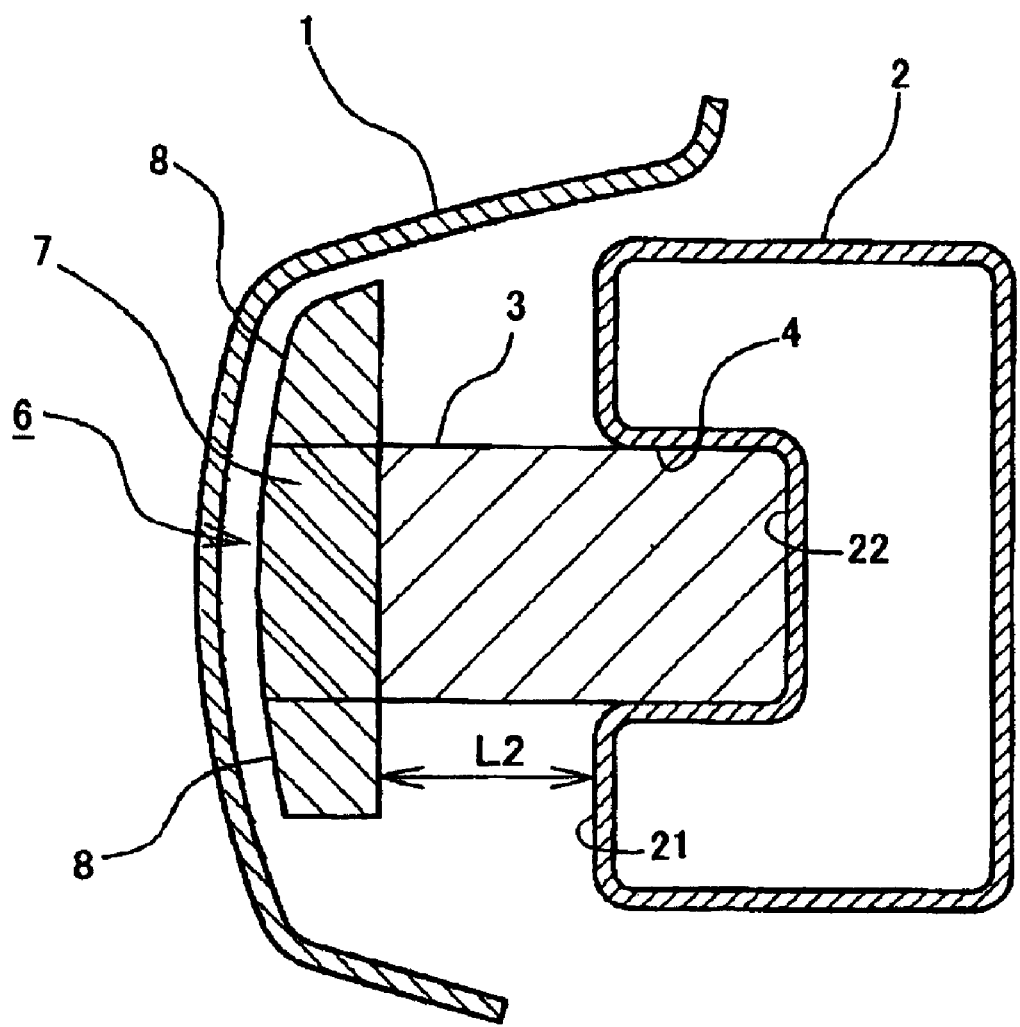
FIG. 8 is a sectional view similar to FIG. 6, showing a further embodiment of a bumper according to the present invention.

The energy absorbing body 6 or 12 need not be a uniform material but may be a composite material. For example, as shown in FIG. 8, the energy absorbing body 6 may be composed of a center region 7 made of a resin foam (which may be made of the same foam and may have the same apparent density as the foam material 3) and upper and lower regions 8 connected to the center region 7 and made of a different material such as a resin foam having a higher apparent density than that of the center region 7. The energy absorbing body 6 composed of the center, upper and lower regions 7 and 8 may be prepared by bonding these regions using an adhesive, by fuse-bonding or by using any suitable connecting means. Alternatively, the energy absorbing body 6 (or 12), when made of a resin foam, may be molded. For example, expanded beads having different densities may be filled into respective chambers of a mold cavity partitioned by a partition plate (in the form of a straight plate, a corrugated plate or a comb-like plate). After the removal of the partition plate, the mold is closed and heated to produce a composite molding.

FIGS. 5(a), 5 (b) and 5(d) show further embodiments of the present invention as including an energy absorbing body 13 which is similar to the energy absorbing body 6 or 12. The energy absorbing body 13 is provided on a portion of the front face 21 other than the depressed portion 22 and functions in the same manner as the energy absorbing body 6 or 12. Preferably, the energy absorbing body 13 is fixed to the surface of the front face 21 by, for example, using an adhesive. When the thickness of the energy absorbing body 13 along the front to rear direction is represented by L4, the ratio (L2–L4)/L1 is preferably in the range of 0.4 to 0.9, more preferably 0.5 to 0.8, most preferably 0.5 to 0.7 (L1 and L2 are as defined above). Further, it is preferred that the length L1 be in the range of 40 to 150 mm, more preferably 50 to 130 mm, most preferably 60 to 120 mm. It is also preferred that the thickness L4 be in the range of 10 to 70 mm, more preferably 15 to 50 mm. The foam material 3 is preferably located such that the rear end thereof is abutted against the bottom of the depressed portion 22.

As used herein the term "apparent density" of the foam material 3 and the energy absorbing bodies 6, 12 and 13 made of a resin foam is defined by the formula D1=W1/V1, wherein D1 represents the apparent density thereof, W1 represents the weight thereof and V1 represents the volume thereof. The volume V1 is measured by an immersion method in which the specimen is immersed in water contained in a graduation cylinder. From the rise in level of the water, the volume V1 can be determined.

As described previously, polyolefin-based resin foam is preferably used as the compressable energy absorbing foam material 3. The term "polyolefin-based resin foam" is intended to refer to a foam made of a base resin containing a polyolefin-based resin in an amount of at least 60% by weight, preferably 80 to 100% by weight. Examples of the polyolefin-based resin include polyethylene-based resins such as high density polyethylenes, low density polyethylenes, linear low density polyethylenes, and polypropylene-based resins such as described below. The polyolefin-based resin may contain no more than 50% by weight, preferably no more than 40% by weight, more preferably no more than 20% by weight, of one or more comonomers other than olefinic monomers such as styrene.

Among polyolefin-based resin foams, foams obtained from polypropylene-based resins, especially foams obtained by molding polypropylene-based resin beads, are particularly preferred for use as the foam material 3 for reasons of excellent rigidity, heat resistance, chemical resistance and ease in molding into desired shapes. A foam obtained from polypropylene-based resin beads has the additional advantage that its cross-sectional area scarcely increases when the foam is compressed. Thus, the foam material 3 when made of such a polypropylene-based resin foam can be suitably compressed into the U-shaped recess 4 or stepped portion 11a or 11b at the time of a collision.

Examples of the polypropylene-based resin include propylene homopolymers, copolymers of propylene and styrene and copolymers of propylene and other olefins such as propylene-butene block copolymers, propylene-butene random copolymers, and ethylene-propylene block copolymers, ethylene-propylene random copolymers, ethylene-propylene-butene random copolymers. Propylene homopolymers are particularly preferred for use, since a foam produced from expanded propylene homopolymer beads has excellent collision energy absorbing efficiency.

A foam obtained by molding polypropylene-based resin beads (hereinafter referred to simply as PP molding) to be used as the foam material 3 preferably has an apparent density of 0.11 to 0.025 g/cm$^3$, more preferably 0.09 to 0.04 g/cm$^3$, for reasons of excellent compression characteristics, namely satisfactory protection of pedestrians, while reducing the weight and size of the bumper structure. It is not necessary that the foam material 3 should have a uniform apparent density throughout its whole body. Rather, the foam material 3 may be composed of two or more portions having different apparent densities. In such a case, the apparent density of the foam material 3 is obtainable by dividing its total weight by its whole volume.

Figure 9:
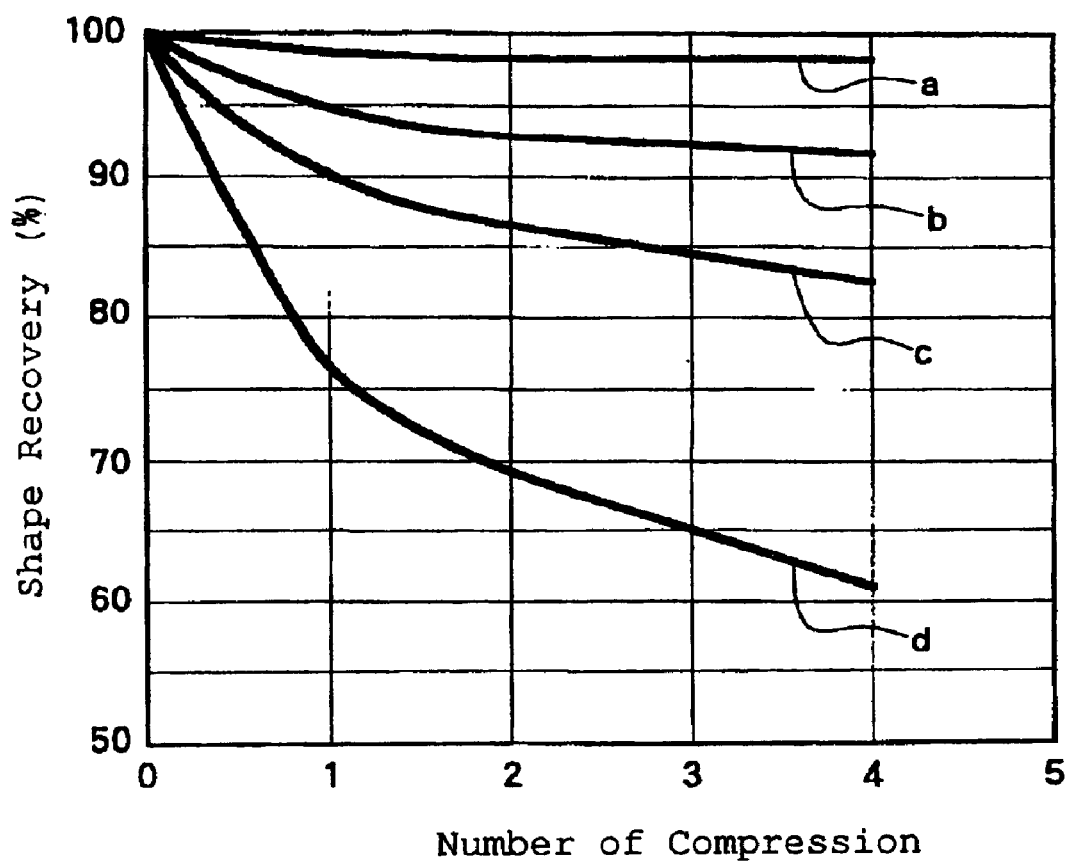
FIG. 9 shows the relationship between the shape recovery of a polypropylene-based resin foam and the number of repetitions of compression thereof at various, strains.

FIG. 9 shows the relationship between the shape recovery of a PP molding and the number of repetitions of compression at various compression strains. A cubic body (80 mm×80 mm×80 mm) of a PP molding having an apparent density of 0.082 g/cm$^3$ is placed between a pair of pressing plates and is compressed at a compression speed of 50 mm/minute. As soon as a given strain percentage has been reached, the pressing plates are moved back at a speed of 50 mm/minute. 30 minutes after the release of the pressure, the thickness (D) of the compressed cube body is measured. The shape recovery is calculated according to the following formula:

Shape recovery (%)=D/80×100.

Similar compression and measurement of the thickness is repeated 4 times in total. The results are shown in FIG. 9 in which the curves a to d are the results for 20% strain (compressed by 16 mm), 50% strain (compressed by 40 mm), 70% strain (compressed by 56 mm) and 90% strain (compressed by 72 mm), respectively. The results shown in FIG. 9 indicate that more than 80% shape recovery is obtainable even when subjected to 4 compressions, as long as the strain is 70% or less.

In the bumper of the present invention, since the compression strain is determined by its L2/L1 ratio (or (L2–L4)/L1 ratio), it is easy to design a suitable bumper structure capable of protecting pedestrians without increasing the front-to-rear length thereof.

Although the foregoing embodiments are described as bumper structures suitable for attachment to the front of a vehicle, the bumper of the present invention is not limited to such applications. The bumper may be used for protecting any required portions (such as thighs and hips) of a pedestrian's body, while preventing damage to the vehicle body.

The following examples will further illustrate the present invention.

EXAMPLE 1

Figure 10A:
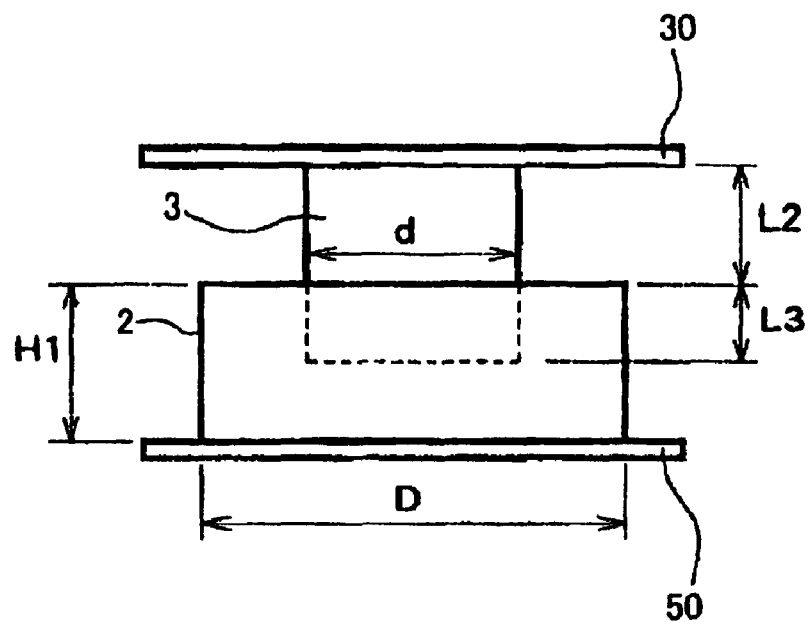
FIG. 10(a) is a schematic front view of a bumper structure of the present invention subjected to a drop impact test.
Figure 10B:
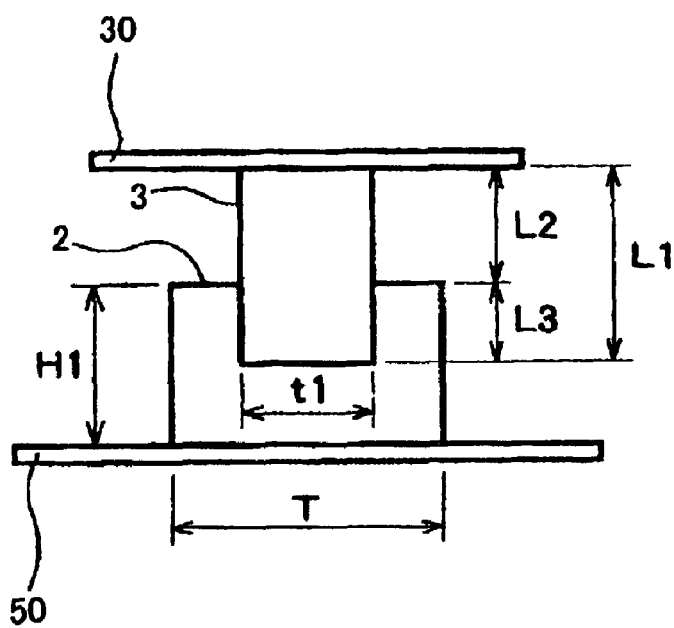
FIG. 10(b) is a side view of the bumper structure of FIG. 10 (a)

A synthetic wood body as shown in FIGS. 10(a) and 10(b) was used as a bumper beam 2. The beam 2 had a height T (in the vertical direction) of 120 mm, a length D (in the lateral direction) of 300 mm and a width H1 (in the front to rear direction) of 80 mm and had a front face provided with a U-shaped recess extending the length of the beam and having a height t1 of 40 mm and a depth L3 of 40 mm. As the energy absorbing foam material 3, a rectangular parallelopiped foamed molding of expanded polypropylene-based resin beads (expanded beads of a propylene-ethylene random copolymer having a tensile modulus of 1,120 MPa) having an apparent density of 0.082 g/cm$^3$, a height t1 (in the vertical direction) of 40 mm, a length d (in the lateral direction) of 150 mm and a width L1 (in the front to rear direction) of 80 mm was used.

The energy absorbing foam material 3 was fitted into the U-shaped recess of the beam 2 as shown in FIG. 10 so that the foam material had a portion protruding from the front face of the beam 2 of a length L2 of 40 mm. The front surface of the foam material 3 was covered with a bumper fascia 30 made of a synthetic resin and having a thickness of 3 mm to form a bumper.

Figure 11:
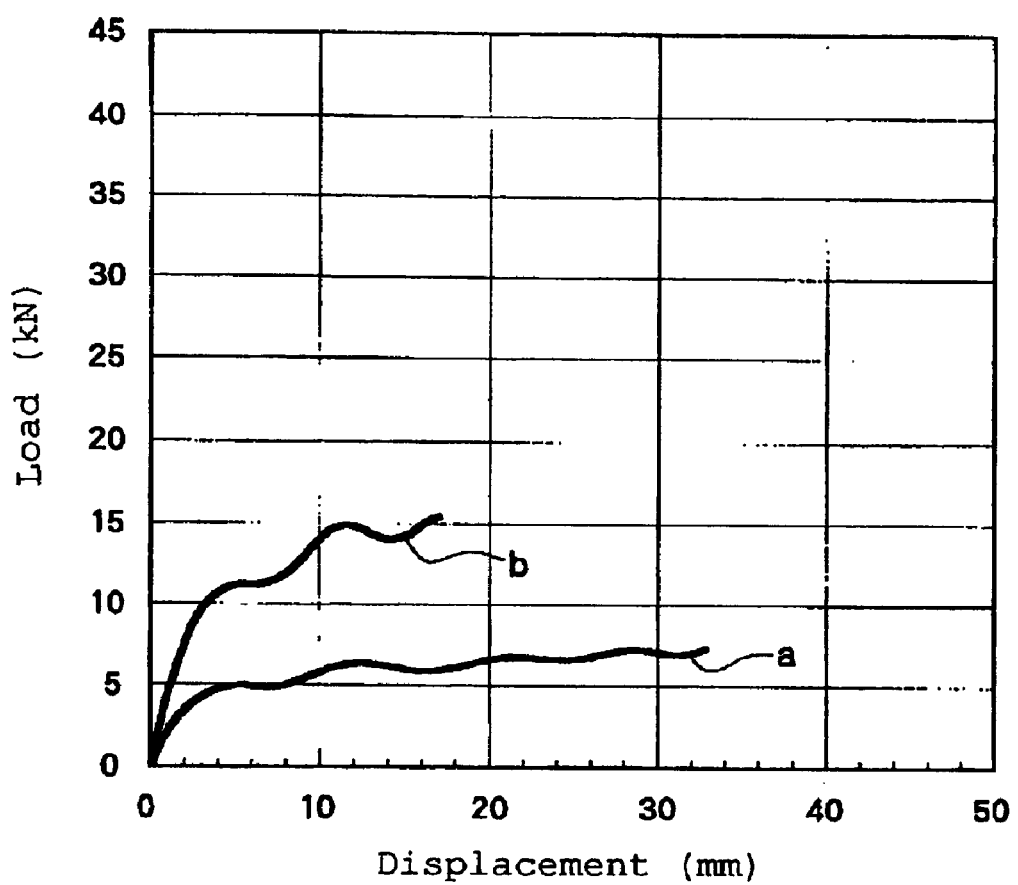
FIG. 11 is a graph showing the relationship between the displacement of a flat impactor and the loads generated in the bumpers of FIG. 10(a) and FIG. 12(a)

The bumper was subjected to a drop impact test using a drop impact dynamic tester. Thus, the bumper was placed on a stand 50 of an impact dynamic tester with the outer surface of the fascia 30 facing upward and horizontal. A steel impactor (weight: 16 kg, size: 40 cm length ×40 cm width ×3 cm thickness) having a flat lower surface and positioned 103 cm above the fascia 30 was allowed to free fall onto the fascia 30 with its lower surface kept horizontal and colliding with the flat outer surface of the fascia 30. In this case, the impact energy was about 162 J. The relationship between the displacement of the impactor and the load generated in the bumper was measured to give the results shown in FIG. 11 as curve "a". As will be appreciated from FIG. 11, the maximum displacement was about 33 mm and the maximum load generated was about 7 kN.

Comparative Examle 1

Figure 12A:
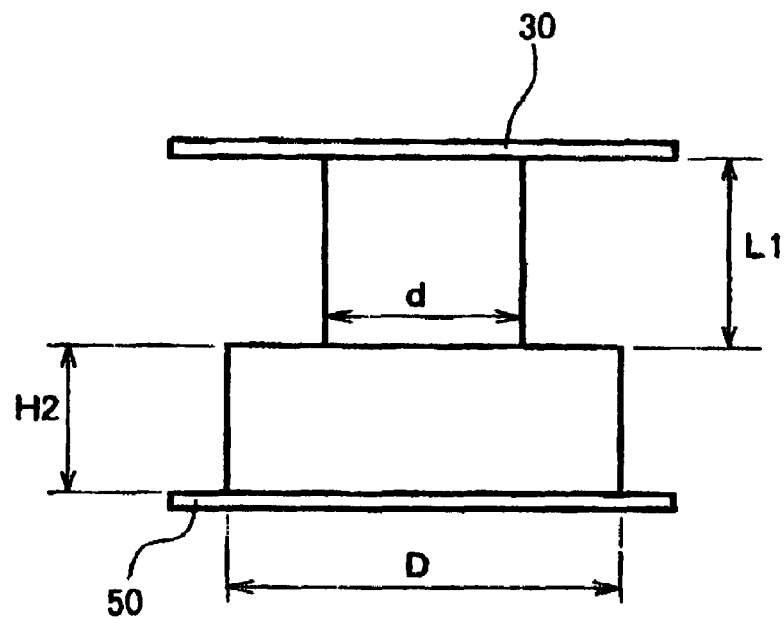
FIG. 12(a) is a schematic front view of a known bumper structure subjected to a drop impact test.
Figure 12B:
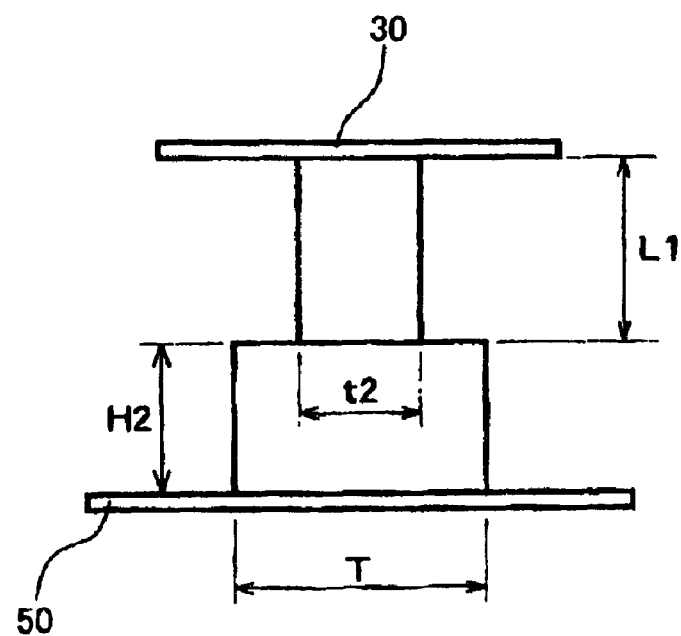
FIG. 12(b) is a side view of the bumper structure of FIG. 12(a)

A synthetic wood body as shown in FIGS. 12(*a*) and 12(*b*) was used as a bumper beam. The beam had a vertical height T of 120 mm, a lateral length D of 300 mm and a width H2 (front to rear) of 80 mm. The energy absorbing foam material was a rectangular parallelopiped foamed molding of expanded beads of a propylene-ethylene random copolymer ("polypropylene-based resin") having a tensile modulus of 1,120 MPa, an apparent density of 0.082 g/cm$^3$, a vertical height t2 of 80 mm, a lateral length d of 150 mm and a width L1 (front to rear) of 40 mm. The front surface of the foam material was covered with a bumper fascia 30 made of a synthetic resin and having a thickness of 3 mm to form a bumper.

The bumper was subjected to a drop impact test using a drop impact dynamic tester in the same manner as that of Example 1. The relationship between the displacement of the impactor and the load generated in the bumper structure was measured to give the results shown by the curve "b" in FIG. 11. As will be appreciated from FIG. 11, the maximum displacement was about 17 mm and the maximum load generated was about 16 kN which was much higher than that of the bumper structure of Example 1.

EXAMPLE 2

A synthetic wood body as shown in FIGS. 10(*a*) and 10(*b*) was used as a bumper beam 2. The beam 2 had a vertical height T of 120 mm, a lateral length D of 300 mm, a width H1 (front to rear) of 80 mm, a front face provided with a U-shaped recess extending the entire length of the beam, a height t1 of 35 mm and a depth L3 of 50 mm. The energy absorbing foam material 3 was a rectangular parallelopiped foamed molding of expanded beads of a propylene-ethylene random copolymer having a tensile modulus of 1,120 MPa, an apparent density of 0.082 g/cm$^3$, a vertical height t1 of 35 mm, a lateral length d of 100 mm and a width L1 (front to rear) of 100 mm.

The energy absorbing foam material 3 was fitted into the U-shaped recess of the beam 2 as shown in FIG. 10 so that a 50 mm portion protruded from the front face of the beam 2. The front surface of the foam material 3 was covered with a bumper fascia 30, made of a synthetic resin and having a thickness of 3 mm, to form a bumper.

Figure 13:
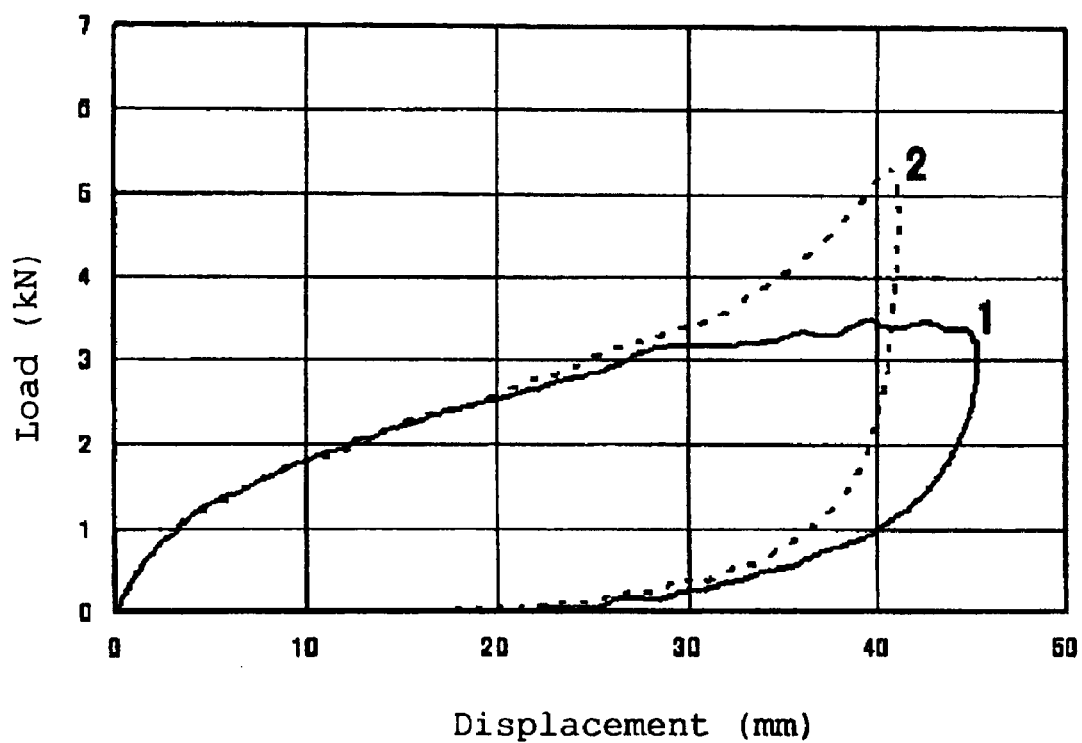
FIG. 13 is a graph showing the relationship between the displacement of a cylindrical impactor and the load generated in the bumpers of FIG. 10(a) and FIG. 12(a)
Figure 14:
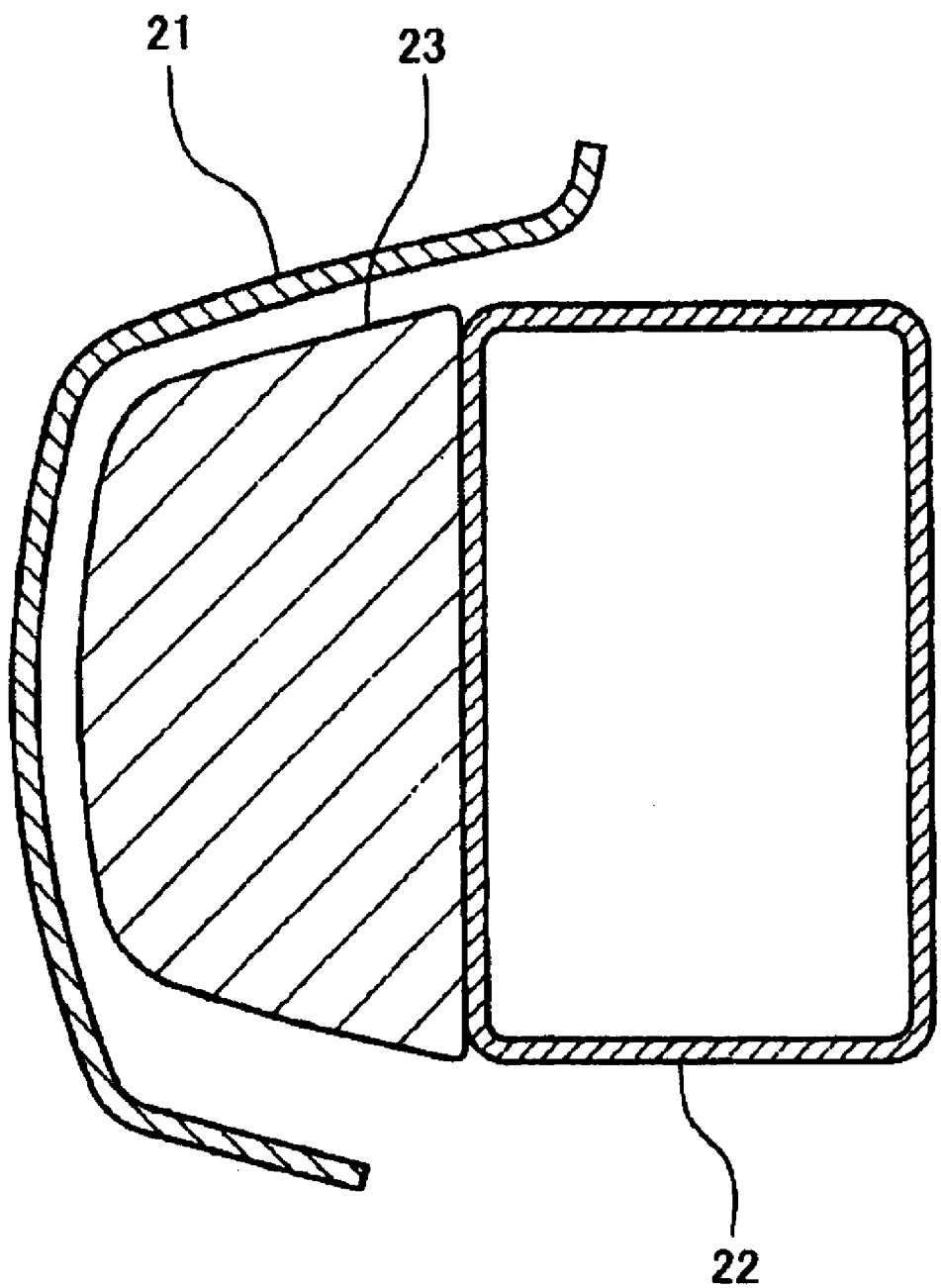
FIG. 14 is a sectional view similar to FIG. 2 showing a conventional bumper structure.

The bumper was subjected to a drop impact test using a drop impact dynamic tester. Thus, the bumper was placed on a stand 50 of an impact dynamic tester with the outer surface of the fascia 30 horizontal and facing upward. A cylindrical steel impactor (weight: 21.4 kg, outer diameter: 70 mm) positioned at a distance 715 mm above the fascia 30 was allowed to free fall onto the fascia 30, with the axis of the cylindrical impactor oriented normal to the lengthwise direction of the bumper beam 2. In this case, the impact energy was about 150 J. The relationship between the displacement of the impactor and the load generated in the bumper structure was measured to give the results shown in FIG. 13 as curve 1. As will be appreciated from FIG. 13, the maximum displacement was about 45 mm and the maximum load generated was about 3.5 kN.

Comparative Example 2

A synthetic wood body as shown in FIGS. 12(*a*) and 12(*b*) was used as a bumper beam. The beam had a vertical height T of 120 mm, a lateral length D of 300 mm and a width H2 (front to rear) of 80 mm. The energy absorbing foam material was a rectangular parallelopiped foamed molding of expanded beads of a propylene-ethylene random copolymer having a tensile modulus of 1,120 Mpa, an apparent density of 0.082 g/cm$^3$, a vertical height t2 of 35 mm, a lateral length d of 100 mm and a width L1 (front to rear) of 50 mm. The front surface of the foam material was covered with a bumper fascia 30 made of a synthetic resin and having a thickness of 3 mm to form a bumper.

The bumper was subjected to a drop impact test using a drop impact dynamic tester in the same manner as that of Example 2. The relationship between the displacement of the impactor and the load generated in the bumper structure was measured to give the results shown by curve 2 in FIG. 13. As will be appreciated from FIG. 13, the maximum displacement was about 42 mm and the maximum load generated was about 5.3 kN.

In the impact tests in Example 2 and Comparative Example 2, the outer diameter of the cylindrical impactor of 70 mm was selected to represent the approximate diameter of an adult leg. In order to protect a pedestrian's leg, it is necessary for a bumper to sufficiently absorb impact energy while suppressing leg impact to avoid serious injury. In the above tests, the load generated (reaction force) is desirably 3.5 kN or less. The bumper structure of Example 2 can fully absorb the collision energy and the reaction force, e.g., on the leg of a pedestrian, within the desired range. In the case of Comparative Example 2, the load generated exceeds 3.5 kN is greater than 30 mm because the foam material has been compressed to a strain of 70% or more (bottoming-out), though the bumper structure can fully absorb the collision energy. In order to reduce the reaction force (generated load) in the case of Comparative Example 2, it would be necessary to increase the length L1 of the foam material.

What is claimed is:

1. A bumper for attachment to the front of a vehicle, comprising;

an elongated bumper beam, said bumper beam having a front face with top and bottom longitudinal edges and at least one rearwardly depressed portion including a top edge depressed portion extending rearwardly from the top longitudinal edge of the front face a distance L3 from a forward portion of the front face, forming a step in the front face at said top longitudinal edge, and extending lengthwise of said bumper beam;

a compressible, energy absorbing top foam material extending lengthwise of said bumper beam, said foam material having a first portion received in said depressed portion and a second portion protruding forwardly a distance L2 from said forward portion of said front face of said bumper beam, wherein the entire said second portion is compressible within said depressed portion upon impact of a collision and wherein said at least one rearwardly depressed portion has a vertical dimension 30 to 80% of the vertical dimension of said bumper beam; and a bumper fascia covering said foam material.

2. A bumper as claimed in claim 1, further comprising an energy absorbing body provided at a front end of said second portion of said foam material and having a vertical dimension greater than the vertical dimension of said depressed portion.

3. A bumper as claimed in claim 1, wherein said foam material has a width in the front to rear direction of L1 and said second portion of said foam material has a width in the front to rear direction of L2, and wherein the ratio L2/L1 is in the range of 0.4 to 0.9.

4. A bumper as claimed in claim 1, further comprising an energy absorbing body, separate from said top foam material and provided on a portion of said front face other than said depressed portion.

5. A bumper as claimed in claim 4, wherein said foam material has a width in the front to rear direction of L1, said second portion of said foam material has a width in the front to rear direction of L2 and said energy absorbing body has a thickness in the front to rear direction of L4, and wherein the ratio (L2–L4)/L1 is in the range of 0.4 to 0.9.

6. A bumper as claimed in claim 1, wherein said foam material is a polyolefin-based resin foam.

7. A bumper as claimed in claim 1, wherein said foam material is a polypropylene-based resin foam having an apparent density of 0.11 to 0.025 g/cm$^3$.

8. A bumper as claimed in claim 1 wherein said foam material is a molding of polypropylene-based resin beads.

9. A bumper as claimed in claim 8 wherein said molding has a density of 0.09 to 0.025 g/cm$^3$.

10. A bumper as claimed in claim 1 wherein said bumper beam further has a bottom edge depressed portion extending rearwardly from the bottom longitudinal edge of the front face a distance L3 from the forward portion of the front face, forming a step in the front face at said bottom longitudinal edge, and extending lengthwise of said bumper beam; and further comprising:

a compressible, energy absorbing bottom foam material extending lengthwise of said bumper beam, said bottom foam material having a first portion received in said bottom edge depressed portion and a second portion protruding forwardly a distance L2 from said forward portion of from said front face of said bumper beam, wherein the entire said second portion of said bottom foam material is compressible within said bottom edge depressed portion upon impact of a collision and wherein said top edge depressed portion and said bottom edge depressed portion together have a vertical dimension 30 to 80% of the vertical dimension of said bumper beam.

11. A bumper as claimed in claim 1 wherein said foam material has a width in the front to rear direction of L1 and wherein L2 is 60–70% of L1.

12. A bumper as claimed in claim 10 wherein said top foam material and said bottom foam material each have a width in the front to rear direction of L1 and wherein L2 is 60–70% of L1.

13. A bumper as claimed in claim 1 wherein said foam material has a front to rear width L1 and top and bottom planar surfaces, in parallel with each other and coextensive with L1.

14. A bumper as claimed in claim 10 wherein each of said top foam material and said bottom foam material has a width in the front to rear direction of L1 and top and bottom planar surfaces in parallel with each other and coextensive with L1.

* * * * *